US008161418B2

(12) United States Patent  (10) Patent No.: US 8,161,418 B2
Sodhi et al.  (45) Date of Patent: Apr. 17, 2012

(54) SYSTEM AND METHOD FOR GENERATING AN INFORMATIONAL MEDIA DISPLAY ON A DOCUMENT PROCESSING DEVICE

(75) Inventors: Ajit Sodhi, Irvine, CA (US); Man M. Garg, Cerritos, CA (US); Alok Mathur, Lake Forest, CA (US); Harish T. Syedmohammed, Lake Forest, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 842 days.

(21) Appl. No.: 12/106,481

(22) Filed: Apr. 21, 2008
(Under 37 CFR 1.47)

(65) Prior Publication Data
US 2009/0265653 A1 Oct. 22, 2009

(51) Int. Cl.
*G06F 3/00* (2006.01)
*G06F 3/14* (2006.01)
(52) U.S. Cl. ........ 715/867; 715/765; 715/866; 715/205; 358/1.1; 705/14.1; 705/14.4
(58) Field of Classification Search .................. 715/733, 715/744, 747, 764, 765, 774, 781, 866, 867, 715/962, 963, 200, 205; 705/14; 358/1.1, 358/1.15, 530
See application file for complete search history.

(56) References Cited

U.S. PATENT DOCUMENTS

| 5,905,492 A * | 5/1999 | Straub et al. ................ 715/744 |
| 5,946,646 A * | 8/1999 | Schena et al. ................ 702/177 |
| 6,507,351 B1 * | 1/2003 | Bixler .......................... 715/810 |
| 7,757,176 B2 * | 7/2010 | Vakil et al. ................... 715/753 |
| 2002/0196275 A1 * | 12/2002 | Willner et al. ............... 345/744 |
| 2004/0041849 A1 * | 3/2004 | Mock et al. .................. 345/867 |
| 2008/0229258 A1 * | 9/2008 | Watson ........................ 715/867 |

* cited by examiner

Primary Examiner — Xiomar L Bautista
(74) Attorney, Agent, or Firm — SoCal IP Law Group LLP; Steven C. Sereboff; Jonathan Pearce

(57) ABSTRACT

The subject application is directed to a system and method for generating an informational media display on a document processing device. A document processing signal representing the status of a document processing operation on an associated document processing device is first received. Media content data and preference data corresponding to user-specified media content data is then received. Pre-selected media content data is then generated on a display of a user interface associated with the document processing device when the device is idle, as determined by the document processing status signal. Display of the pre-selected media content is then suspended when the document processing signal indicates that the document processing device is active. User-specified media data content is then generated on the display of the user interface when the received document processing signal corresponds to active status of the associated document processing device.

19 Claims, 7 Drawing Sheets

SYSTEM AND METHOD FOR GENERATING AN INFORMATIONAL MEDIA DISPLAY ON A DOCUMENT PROCESSING DEVICE

BACKGROUND OF THE INVENTION

The subject application is directed generally to enhanced use of user interface displays and is particularly suited for display of content on shared devices, such as document processing devices.

Graphical user interfaces are frequently used to facilitate control of data processing devices, including devices such as information kiosks, and document processing devices such as copiers, printers, facsimile machines, scanners, or multifunction peripherals having two or more of such functions. Graphical user interfaces are advantageous, insofar as they provide a flexible, user-friendly display where software is used to generate ordered, hierarchical controls for the many functions associated with complex devices. Frequently, device control or operation functionality employs one or more selectable display areas, such as a key display or graphical icon associated with such functionality. A user selects the functionality in accordance with the associated display indicia and thus completes a selected operation.

Graphical user interfaces are frequently contained in a relatively small display area, such as a touch screen control. While devices are typically networked to allow for shared use among multiple users, displays are geared to control or view machine or job status. To the extent that such displays show content acquired from the network, it is typically content that is associated with a document for which processing is desired, such as a thumbnail image of a document to be printed.

SUMMARY OF THE INVENTION

In accordance with one embodiment of the subject application, there is provided a system and method directed to enhanced use of user interface displays.

Further in accordance with one embodiment of the subject application, there is provided a system and method for the display of content on shared devices, such as document processing devices.

Still further in accordance with one embodiment of the subject application, there is provided a system for generating an informational media display on a document processing device. The system comprises means adapted for receiving a document processing signal representative of status of a document processing operation on an associated document processing device. The system also comprises means adapted for receiving media content data and means adapted for receiving preference data corresponding to user-specified media content data. The system further comprises means adapted for generating a display of pre-selected media content data on an associated user interface of the document processing device when the document processing signal indicates that the associated document processing device is idle. The system also includes means adapted for suspending display of the pre-selected media content data on the user interface when the document processing signal indicates that the associated document processing device is active and means adapted for generating a display of user-specified media content data when the document processing signal indicates that the associated document processing device is active.

In one embodiment of the subject application, the system further comprises means adapted for receiving an electronic document into the document processing device, the electronic document having user identification data associated therewith. The system also includes selection means adapted for selecting user-specified media content data in accordance with received user identification data.

In another embodiment of the subject application, the media content data is comprised of at least one of an advertisement, coupon, news item, calendar listing, reminder, and entertainment item. Preferably, the media content data is comprised of an RSS feed.

In a further embodiment of the subject application, the system further comprises means adapted for receiving a document output request corresponding to media content data displayed on the user interface and means adapted for generating a tangible document output corresponding to the displayed media content in accordance with a received document output request.

In yet another embodiment of the subject application, the system also includes means adapted for periodically altering the display of pre-selected media content data so as to perform a screen saver operation on the user interface.

In another embodiment of the subject application, the system further includes means adapted for selectively generating indicia corresponding to control of the document processing device on the user interface in accordance with a received document processing signal.

Still further in accordance with one embodiment of the subject application, there is provided a method for generating an informational media display on a document processing device in accordance with the system as set forth above.

Still other advantages, aspects, and features of the subject application will become readily apparent to those skilled in the art from the following description, wherein there is shown and described a preferred embodiment of the subject application, simply by way of illustration of one of the modes best suited to carry out the subject application. As it will be realized, the subject application is capable of other different embodiments, and its several details are capable of modifications in various obvious aspects, all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for enhanced use of user interface displays. In particular, the subject application is directed to a system and method for the display of content on shared devices, such as document processing devices. More particularly, the subject application is directed to a system and method that allows a user to generate an informational media display on a document processing device. It will become apparent to those skilled in the art that the system and method described herein are suitably adapted to a plurality of varying electronic fields employing shared content including, for example and without limitation, communications, general computing, data processing, document processing, and the like. The preferred embodiment, as depicted in FIG. 1, illustrates a document processing field for example purposes only and is not a limitation of the subject application solely to such a field.

Figure 1:
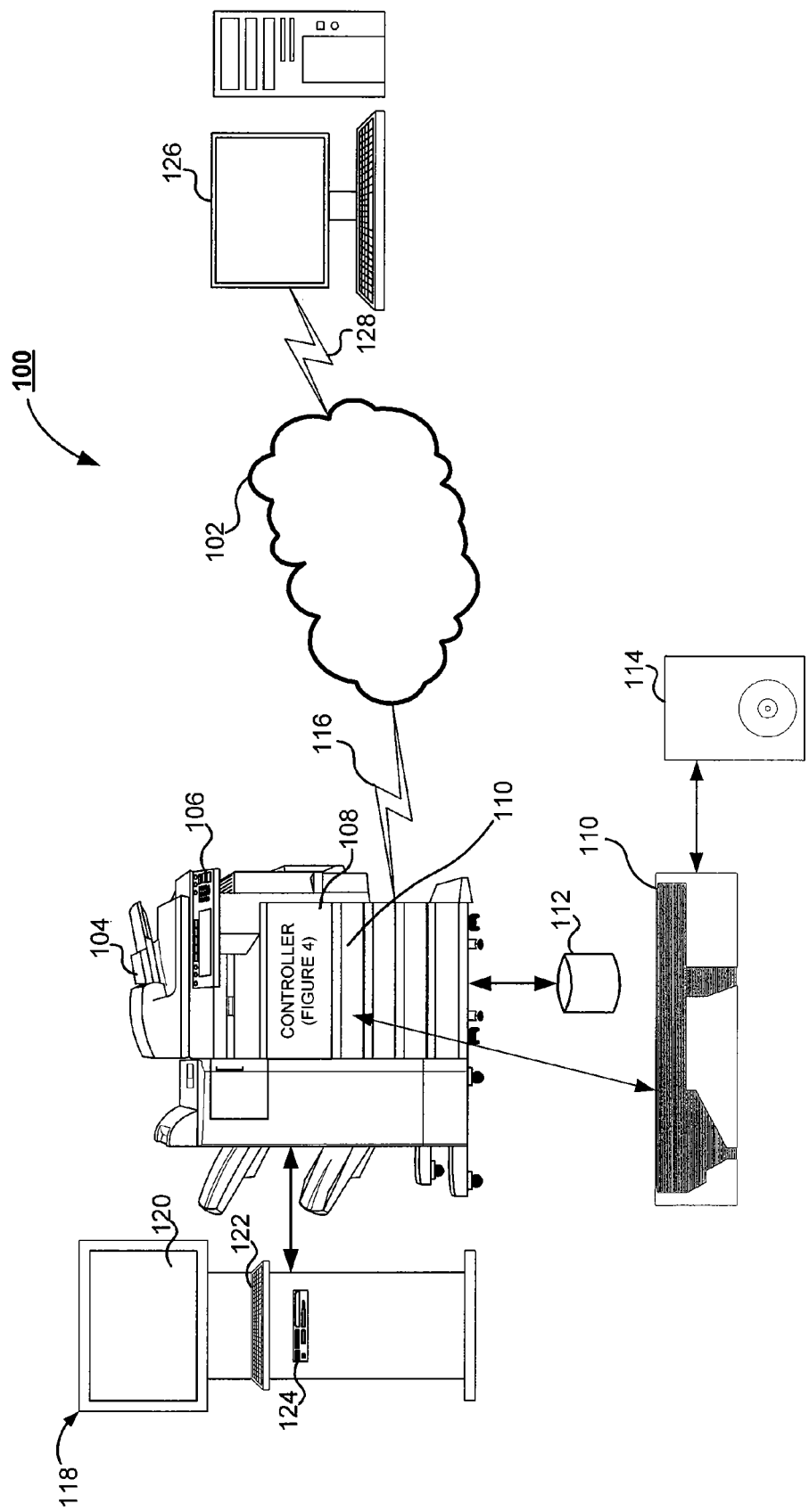
FIG. 1 is an overall diagram of a system for generating an informational media display on a document processing device according to one embodiment of the subject application.

Referring now to FIG. 1, there is shown an overall diagram of a system 100 for generating an informational media display on a document processing device in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art that is capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by myriad conventional data transport mechanisms such as, for example and without limitation, Token-Ring, 802.11(x), Ethernet, or other wireless or wire-based data communication mechanisms. The skilled artisan will appreciate that, while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, and the like. Suitable commercially-available document processing devices include, for example and without limitation, the TOSHIBA e-Studio Series Controller. In accordance with one aspect of the subject application, the document processing device 104 is suitably adapted to provide remote document processing services to external or network devices. Preferably, the document processing device 104 includes hardware, software, or any suitable combination thereof configured to interact with an associated user, a networked device, or the like. The functioning of the document processing device 104 will better be understood in conjunction with the block diagrams illustrated in FIGS. 2 and 3, explained in greater detail below.

According to one embodiment of the subject application, the document processing device 104 is suitably equipped to receive a plurality of portable storage media including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components suitably adapted to present data to the associated user, as are known in the art. In accordance with one embodiment of the subject application, the user interface 106 comprises a display suitably adapted to display one or more graphical elements, text data, images, or the like to an associated user, receive input from the associated user, and communicate the same to a backend component such as a controller 108, as explained in greater detail below. Preferably, the document processing device 104 is communicatively coupled to the computer network 102 via a communications link 116. As will be understood by those skilled in the art, suitable communications links include, for example and without limitation, WIMAX, 802.11a, 802.11b, 802.11g, 802.11(x), BLUETOOTH, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof configured to control the operations of the associated document processing device 104, facilitate the display of images via the user interface 106, direct the manipulation of electronic image data, and the like. For purposes of explanation, the controller 108 is used to refer to any of the myriad components associated with the document processing device 104, including hardware, software, or combinations thereof functioning to perform, cause to be performed, control, or otherwise direct the methodologies described hereinafter. It will be understood by those skilled in the art that the methodologies described with respect to the controller 108 are capable of being performed by any general purpose computing system known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for generating an informational media display on a document processing device of the subject application. The functioning of the controller 108 will better be understood in conjunction with the block diagrams illustrated in FIGS. 4 and 5, explained in greater detail below.

Communicatively coupled to the document processing device 104 is a data storage device 112. In accordance with the preferred embodiment of the subject application, the data storage device 112 is any mass storage device known in the art including, for example and without limitation, magnetic storage drives, hard disk drives, optical storage devices, flash memory devices, or any suitable combination thereof. In the preferred embodiment, the data storage device 112 is suitably adapted to store document data, image data, electronic database data, or the like. It will be appreciated by those skilled in the art that, while illustrated in FIG. 1 as being a separate component of the system 100, the data storage device 112 is capable of being implemented as an internal storage component of the associated document processing device 104, a component of the controller 108, or the like such as, for example and without limitation, an internal hard disk drive or the like. In accordance with one embodiment of the subject application, the data storage device 112 is capable of storing images, specialized media content, multimedia data files, fonts, and the like.

As depicted in FIG. 1, the document processing device 104 further includes one or more media storage trays 110 suitably configured to store output media 114 for output by the document processing device 104. The skilled artisan will appreciate that the media storage tray 110 is representative of any of the myriad storage components associated with the document processing device 104 that are capable of storing sheets of paper of varying sizes, transparencies, blank greeting cards, blank multi-media, blank CD or DVD media, blank business cards, blank perforated media, photographic paper, envelopes, or any other tangible output medium upon which documents or images are rendered.

Illustrated in FIG. 1 is a kiosk 118 communicatively coupled to the document processing device 104 and, in effect, the computer network 102. It will be appreciated by those skilled in the art that the kiosk 118 is capable of being implemented as a separate component of the document processing device 104 or as an integral component thereof. Use of the kiosk 118 in FIG. 1 is for example purposes only, and the skilled artisan will appreciate that the subject application is capable of implementation without the use of the kiosk 118. In accordance with one embodiment of the subject application, the kiosk 118 includes a display 120 and a user input device 122. As will be understood by those skilled in the art, the kiosk 118 is capable of implementing a combination user input device/display, such as a touch screen interface. According to one embodiment of the subject application, the kiosk 118 is suitably adapted to display prompts to an associated user, receive instructions from the associated user, receive payment data, receive selection data from the associated user, and the like. Preferably, the kiosk 118 includes a magnetic card reader, conventional bar code reader, or the like suitably adapted to receive and read payment data from a credit card, coupon, debit card, or the like. The system 100 of FIG. 1 also includes a portable storage device reader 124 coupled to the kiosk 118 and suitably adapted to receive and access myriad different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

The system 100 illustrated in FIG. 1 further depicts a user device 126 in data communication with the computer network 102 via a communications link 128. It will be appreciated by those skilled in the art that the user device 126 is shown in FIG. 1 as a computer workstation for illustration purposes only. As will be understood by those skilled in the art, the user device 126 is representative of any personal computing device known in the art, including, for example and without limitation, a laptop computer, a personal computer, a personal data assistant, a web-enabled cellular telephone, a smart phone, a proprietary network device, or other web-enabled electronic device. The communications link 128 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 126 is suitably adapted to generate and transmit electronic documents, multimedia files, document processing instructions, user interface modifications, upgrades, updates, personalization data, or the like, to the document processing device 104, or any other similar device coupled to the computer network 102. In accordance with one embodiment of the subject application, the user device 126 includes a web browser application, suitably adapted to securely interact with the document processing device 104, or the like.

Figure 2:
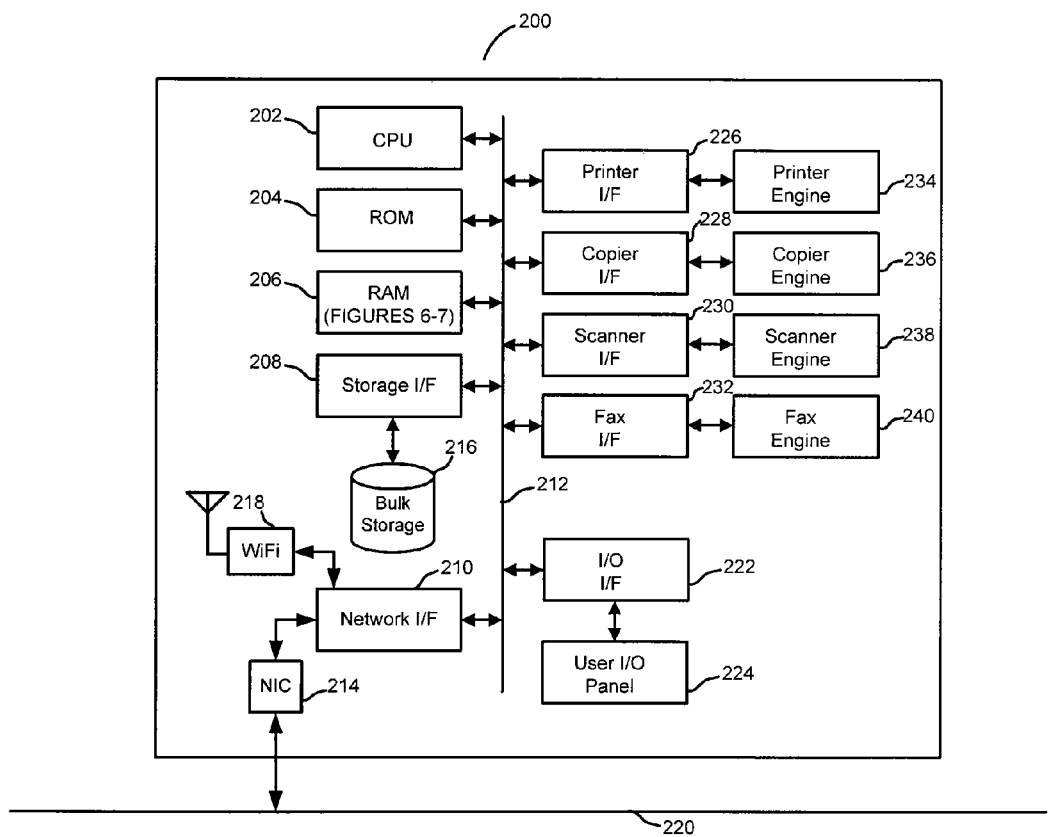
FIG. 2 is a block diagram illustrating device hardware for use in the system for generating an informational media display on a document processing device according to one embodiment of the subject application.

Turning now to FIG. 2, illustrated is a representative architecture of a suitable device 200 (shown in FIG. 1 as the document processing device 104) on which operations of the subject system are completed. Included is a processor 202 suitably comprised of a central processor unit. However, the processor 202 may be advantageously composed of multiple processors working in concert with one another, as will be appreciated by one of ordinary skill in the art. Also included is a non-volatile or read only memory 204, which is advantageously used for static or fixed data or instructions such as BIOS functions, system functions, system configuration data, and other routines or data used for operation of the device 200.

Also included in the device 200 is random access memory 206 suitably formed of dynamic random access memory, static random access memory, or any other suitable addressable memory system. Random access memory 206 provides a storage area for data instructions associated with applications and data handling accomplished by the processor 202.

A storage interface 208 suitably provides a mechanism for volatile, bulk, or long term storage of data associated with the device 200. The storage interface 208 suitably uses bulk storage such as any suitable addressable or serial storage, such as a disk, optical, tape drive and the like, as shown as 216, as well as any suitable storage medium, as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218 suitably adapted for wireless communication via means such as WIFI, WIMAX, wireless modem, cellular network, or any suitable wireless communication system. It is to be appreciated, however, that the network interface subsystem 210 suitably utilizes any physical or non-physical data transfer layer or protocol layer, as will be appreciated by one of ordinary skill in the art. In the illustration, the network interface card 214 is interconnected for data interchange via a physical network 220 suitably comprised of a local area network, wide area network, or a combination thereof.

Data communication between the processor 202, read only memory 204, random access memory 206, storage interface 208, and the network interface subsystem 210 is suitably accomplished via a bus data transfer mechanism, such as illustrated by bus 212.

Suitable executable instructions on the device 200 facilitate communication with a plurality of external devices such as workstations, document processing devices, other servers, or the like. While in operation a typical device operates autonomously, it is to be appreciated that direct control by a local user is sometimes desirable and is suitably accomplished via an optional input/output interface 222 to a user input/output panel 224, as will be appreciated by one of ordinary skill in the art.

Also in data communication with bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multi-function devices.

Figure 3:
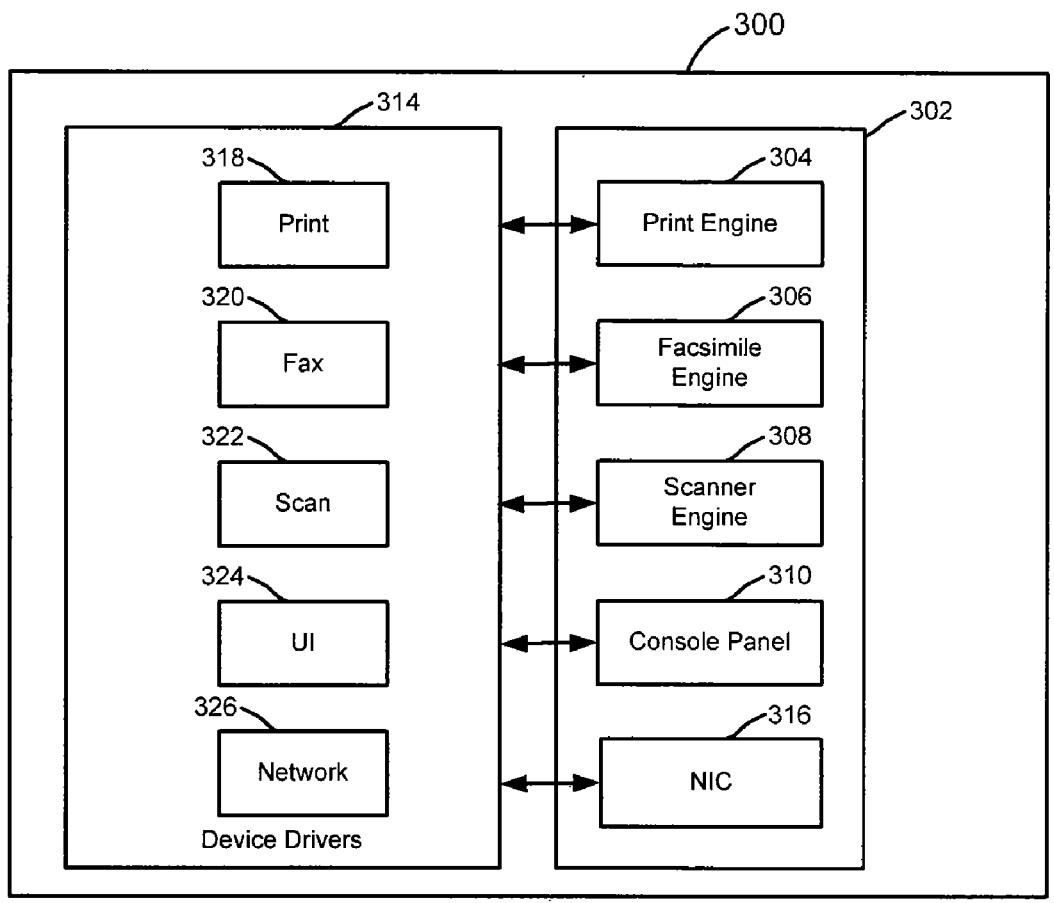
FIG. 3 is a functional diagram illustrating the device for use in the system for generating an informational media display on a document processing device according to one embodiment of the subject application.

Turning now to FIG. 3, illustrated is a suitable document processing device (shown in FIG. 1 as the document processing device 104) for use in connection with the disclosed system. FIG. 3 illustrates suitable functionality of the hardware of FIG. 2 in connection with software and operating system functionality, as will be appreciated by one of ordinary skill in the art. The document processing device 300 suitably includes a document processing engine 302 that facilitates one or more document processing operations.

The document processing engine 302 suitably includes a print engine 304, facsimile engine 306, scanner engine 308, and console panel 310. The print engine 304 allows for output of physical documents representative of an electronic document communicated to the processing device 300. The facsimile engine 306 suitably communicates to or from external facsimile devices via a device such as a fax modem.

The scanner engine 308 suitably functions to receive hard copy documents and, in turn, image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format and is also suitably configured for optical character recognition. Tangible document scanning also suitably functions to facilitate facsimile output thereof.

In the illustration of FIG. 3, the document processing engine 302 also comprises an interface 316 with a network via driver 326 suitably comprised of a network interface card. It will be appreciated that a network thoroughly accomplishes that interchange via any suitable physical and non-physical layer such as wired, wireless, or optical data communication.

The document processing engine 302 is suitably in data communication with one or more device drivers 314, which device drivers 314 allow for data interchange from the document processing engine 302 to one or more physical devices to accomplish the actual document processing operations. Such document processing operations include one or more of printing via driver 318, facsimile communication via driver 320, scanning via driver 322, and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
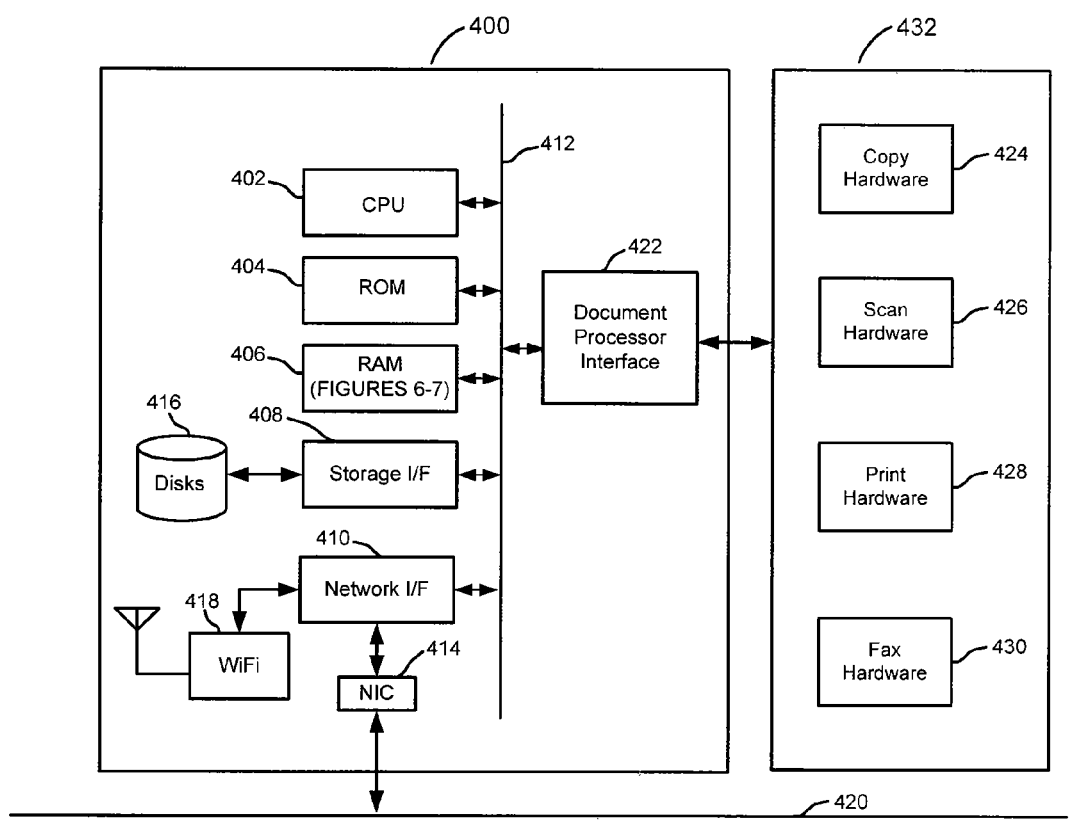
FIG. 4 is a block diagram illustrating controller hardware for use in the system for generating an informational media display on a document processing device according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 108 is representative of any general computing device known in the art that is capable of facilitating the methodologies described herein. Included is a processor 402 suitably comprised of a central processor unit. However, it will be appreciated that processor 402 may advantageously be composed of multiple processors working in concert with one another, as will be appreciated by one of ordinary skill in the art. Also included is a non-volatile or read only memory 404, which is advantageously used for static or fixed data or instructions such as BIOS functions, system functions, system configuration data, and other routines or data used for operation of the controller 400.

Also included in the controller 400 is random access memory 406 suitably formed of dynamic random access memory, static random access memory, or any other suitable addressable and writable memory system. Random access memory 406 provides a storage area for data instructions associated with applications and data handling accomplished by processor 402.

A storage interface 408 suitably provides a mechanism for non-volatile, bulk, or long term storage of data associated with the controller 400. The storage interface 408 suitably uses bulk storage such as any suitable addressable or serial storage, such as a disk, optical, tape drive and the like, as shown as 416, as well as any suitable storage medium, as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the controller 400. By way of example, illustrated is at least one network interface card 414 for data communication with fixed or wired networks, such as Ethernet, token ring, and the like, and a wireless interface 418 suitably adapted for wireless communication via means such as WIFI, WIMAX, wireless modem, cellular network, or any suitable wireless communication system. It is to be appreciated, however, that the network interface subsystem 410 suitably utilizes any physical or non-physical data transfer layer or protocol layer, as will be appreciated by one of ordinary skill in the art. In the illustration, the network interface card 414 is interconnected for data interchange via a physical network 420 suitably comprised of a local area network, wide area network, or a combination thereof.

Data communication between the processor 402, read only memory 404, random access memory 406, storage interface 408, and the network interface subsystem 410 is suitably accomplished via a bus data transfer mechanism, such as illustrated by bus 412.

Also in data communication with bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
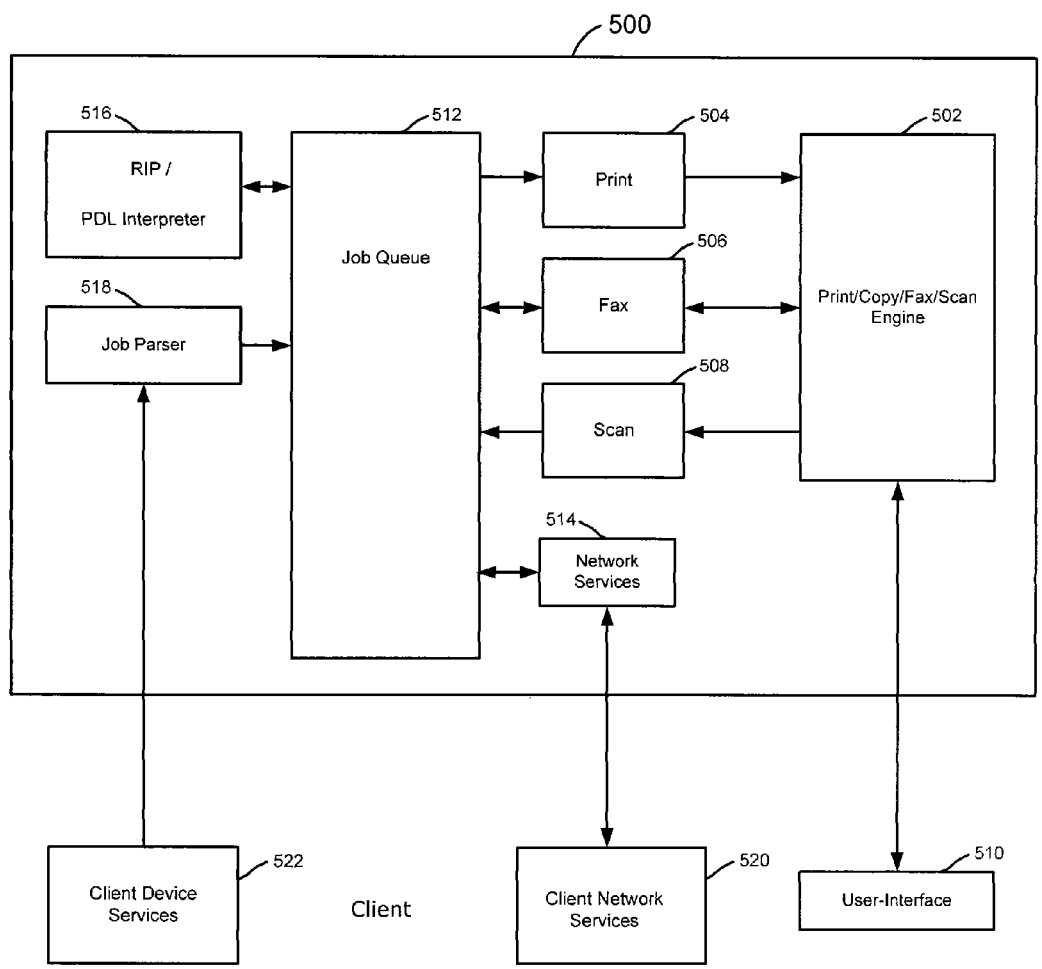
FIG. 5 is a functional diagram illustrating the controller for use in the system for generating an informational media display on a document processing device according to one embodiment of the subject application.

Functionality of the subject system 100 is accomplished on a suitable document processing device, such as the document processing device 104, which includes the controller 400 of FIG. 4, (shown in FIG. 1 as the controller 108) as an intelligent subsystem associated with a document processing device. In the illustration of FIG. 5, controller function 500 in the preferred embodiment includes a document processing engine 502. A suitable controller functionality is that incorporated into the TOSHIBA e-Studio system in the preferred embodiment. FIG. 5 illustrates suitable functionality of the hardware of FIG. 4 in connection with software and operating system functionality, as will be appreciated by one of ordinary skill in the art.

In the preferred embodiment, the engine 502 allows for printing operations, copy operations, facsimile operations, and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited-purpose document processing devices that provide any one or more of the document processing operations listed above.

The engine 502 is suitably interfaced to a user interface panel 510, which panel 510 allows for a user or administrator to access functionality controlled by the engine 502. Access is suitably enabled via an interface local to the controller or remotely via a remote thin or thick client.

The engine 502 is in data communication with the print function 504, facsimile function 506, and scan function 508. These functions 504, 506, 508 facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms such as bit map, page description language or vector format, and the like are suitably relayed from the scan function 508 for subsequent handling via the job queue 512.

The job queue 512 is also in data communication with network services 514. In a preferred embodiment, job control, status data, or electronic document data is exchanged between the job queue 512 and network services 514. Thus, suitable interface is provided for network-based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supply data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter, or any suitable mechanism for interchange of an electronic document to a format better suited for interchange with device functions such as print 504, facsimile 506, or scan 508.

Finally, the job queue 512 is in data communication with a parser 518, which parser 518 suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

In operation, a document processing signal representing the status of a document processing operation on an associated document processing device is first received. Media content data and preference data corresponding to user-specified media content data is then received. A display is generated of pre-selected media content data on a user interface associated with the document processing device when the document processing signal indicates that the document processing device is idle. The display of the pre-selected media content is then suspended when the document processing signal indicates that the document processing device is active. A display of user-specified media content data is then generated when the received document processing signal indicates that the status of the associated document processing device is active.

In accordance with one example embodiment of the subject application, a document processing signal corresponding to the status of document processing operations on the document processing device 104 is received by the controller 108 or other suitable component associated therewith. Preferably, the status signal corresponds to the status of the document processing device 104, e.g., idle (not performing any document processing operations) or active (performing one or more document processing operations). Media content is then received by the document processing device 104, for example from the user device 126, a network server (not shown), designated Internet websites, data stored in the associated data storage device 112, and the like. The media content, such as an RSS feed, includes, for example and without limitation, advertisements, coupons, news items, calendar listings, reminders, entertainment items, and the like.

The document processing status signal is then analyzed by the controller 108 or other suitable component associated with the document processing device 104 to determine whether the document processing device 104 is active or idle. When the document processing device 104 is idle, a display is generated on the user interface 106, the display 120 associated with the kiosk 118, or the like of pre-selected media content. That is, non-user-specific advertisements, offers, news items, calendar listings, entertainment items, or the like are generated on the display 120 of the kiosk 118, the user interface 106, or the like. Periodically, the controller 108 or other suitable component associated with the document processing device 108 or kiosk 118 alters the display of the pre-selected media so as to perform a screen saver operation on the user interface 106, the display 120, or the like. The skilled artisan will appreciate that the period of altering the displayed media content is capable of being set by a suitable device 104 administrator, randomly via operations of the controller 108, externally via a suitable backend server (not shown), and the like.

When it is determined that the document processing device 104 is no longer idle, for example a user has interacted with the user interface 106 or the kiosk 118 (i.e., the user input device 122 or the touch screen display 120), the display of the pre-selected media content is suspended. Indicia are then generated on the user interface 106, the display 120 of the kiosk 118, and the like corresponding to control of the document processing device 104. The skilled artisan will appreciate that suitable control indicia include, for example and without limitation, graphical icons representative of a document processing operation, document processing options, media content, storage, and the like.

A determination is then made as to whether a document processing request has been received from an associated user. It will be understood by those skilled in the art that such a document processing request is capable of originating from a portable storage device inserted via the portable storage device reader 124, the portable storage interface associated with the document processing device 104, transmitted from the user device 126, or the like. In accordance with one embodiment of the subject application, the document processing request received from an associated user is representative of a desired document processing operation, e.g., copy, facsimile, electronic mail transmission, scan to storage, scan to device, or the like. In the event that no document processing request has been received from an associated user, or when no user identification data accompanies a requested document processing operation user, pre-selected media is displayed on the user interface 106, the display 120, or the like, as set forth above. Preferably, the user is prompted via a graphical user interface displayed on the user interface 106 or the display 120 of the kiosk 118 to input user identification data such as a user ID and password, as will be understood by those skilled in the art.

Upon the receipt of an electronic document inclusive of user identification data, i.e., the receipt of a document processing request with user login or identification data, user-specified media content preference data is retrieved from the data storage device 112, from a backend server component (not shown), a suitable website via the Internet, or the like. Specified media content is then selected in accordance with the user identification data from a suitable source, e.g., the Internet, a backend server (not shown), the data storage device 112, or the like. A display of user-specified media content is then generated on the user interface 106 and/or the display 120 associated with the kiosk 118. The skilled artisan will appreciate that the user-specific media content corresponds to user preference data, e.g., types of news articles, product coupons, targeted advertisements, preferred entertainment items, and the like. Thereafter, the document processing device 104 initiates the performance of the requested document processing operation.

When user identification data is not received accompanying a document processing request, pre-selected media content is generated on the user interface 106, the display 120 of the kiosk 118, or the like. The display of such pre-selected media content is periodically altered so as to function as a screen saver, as will be understood by those skilled in the art. Thereafter, the document processing device 104 begins performing the requested document processing operation.

During the performance of the requested document processing operation, a user is able to select one or more of the displayed media content for output by the document processing device 104. Thus, when user selects one or more of the displayed media content for a tangible output, the controller 108 or other suitable component associated with the document processing device 104 retrieves the corresponding media content, irrespective of whether the media is pre-selected content or user-specific content. Thereafter, the document processing device 104 generates a tangible document output on a suitable output media 114 in accordance with the received displayed media output request. In accordance with one embodiment of the subject application, the user is capable of electronically transmitting selected media content via electronic mail, facsimile transmission, or the like. Thus, instead of outputting a tangible document corresponding to the selected media content, an electronic representation of the content is transmitted to a designated recipient, address, or the like.

It will be understood by those skilled in the art that the output of the tangible document corresponding to the selected media content is capable of being output after completion of the document processing operation associated with the document processing request and the ordering of the outputs of the document processing request and the selected media content is for example purposes only.

It will be appreciated by those skilled in the art that the subject application is capable of being implemented such that the document processing device 104 functions as a point-of-sale device, whereupon displayed media content corresponds to actual goods and/or services capable of being purchased by the associated user during document processing operations. In such an implementation, the user is capable of requesting such displayed media content, e.g. goods, services, gift cards, greeting cards, etc., via the associated user interface 106 upon which the media content is displayed. Following the receipt of such request from the user corresponding to displayed media content, the controller 108 or other suitable component associated with the document processing device 104 retrieves necessary data corresponding to the displayed media content. The document processing device 104 then receives any payment data corresponding to the purchase of displayed goods and/or services and generates a tangible output corresponding thereto. In an alternate embodiment, the displayed media content, upon user selection thereof, results in redirection to a website hosted by the advertiser for purchase by the user thereon.

Figure 6:
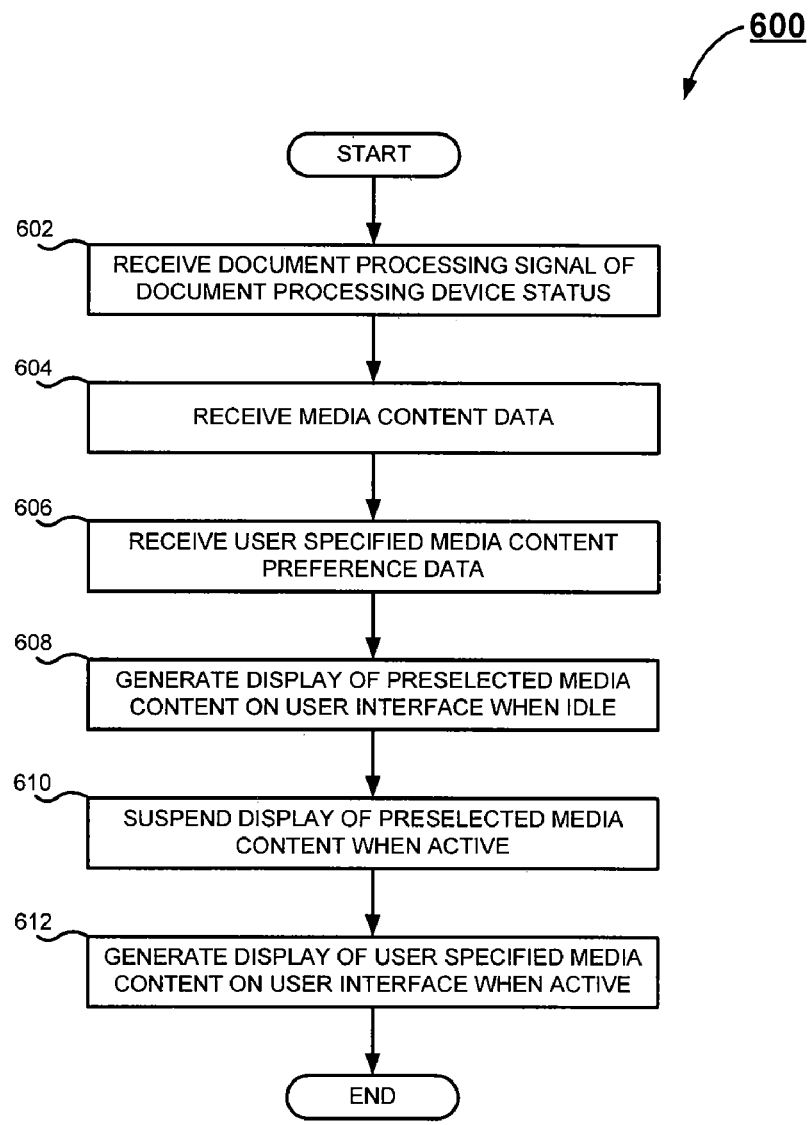
FIG. 6 is a flowchart illustrating a method for generating an informational media display on a document processing device according to one embodiment of the subject application.

The skilled artisan will appreciate that the subject system 100 and components described above with respect to FIG. 1, FIG. 2, FIG. 3, FIG. 4, and FIG. 5 will be better understood in conjunction with the methodologies described hereinafter with respect to FIG. 6 and FIG. 7. Turning now to FIG. 6, there is shown a flowchart 600 illustrating a method for generating an informational media display on a document processing device in accordance with one embodiment of the subject application. Beginning at step 602, the controller 108 or other suitable component associated with the document processing device 104 receives a document processing signal representing the status of a document processing operation on the document processing device 104. At step 604, the controller 108 or other suitable component associated with the document processing device 104 receives media content data. In accordance with one embodiment of the subject application, the media content data corresponds to an RSS feed, an advertisement, a coupon, a news item, a calendar listing, a reminder, an entertainment item, or the like.

Preference data is then received by the controller 108 or other suitable component associated with the document processing device 104 corresponding to user-specified media content at step 606. When the document processing signal indicates that the document processing device 104 is idle, the controller 108 directs the generation, at step 608, of a display of pre-selected media content data on the user interface 106 or display 120 associated with the document processing device 104 or kiosk 118, respectively. At step 610, the display of the pre-selected media content is suspended by the controller 108 or other suitable component associated with the document processing device 104 when the document processing signal indicates that the document processing device 104 is active. Thereafter, at step 612, a display is generated via the user interface 106 and/or display 120 of user-specified media content data when the document processing signal indicates that the associated document processing device 104 is active.

Figure 7:
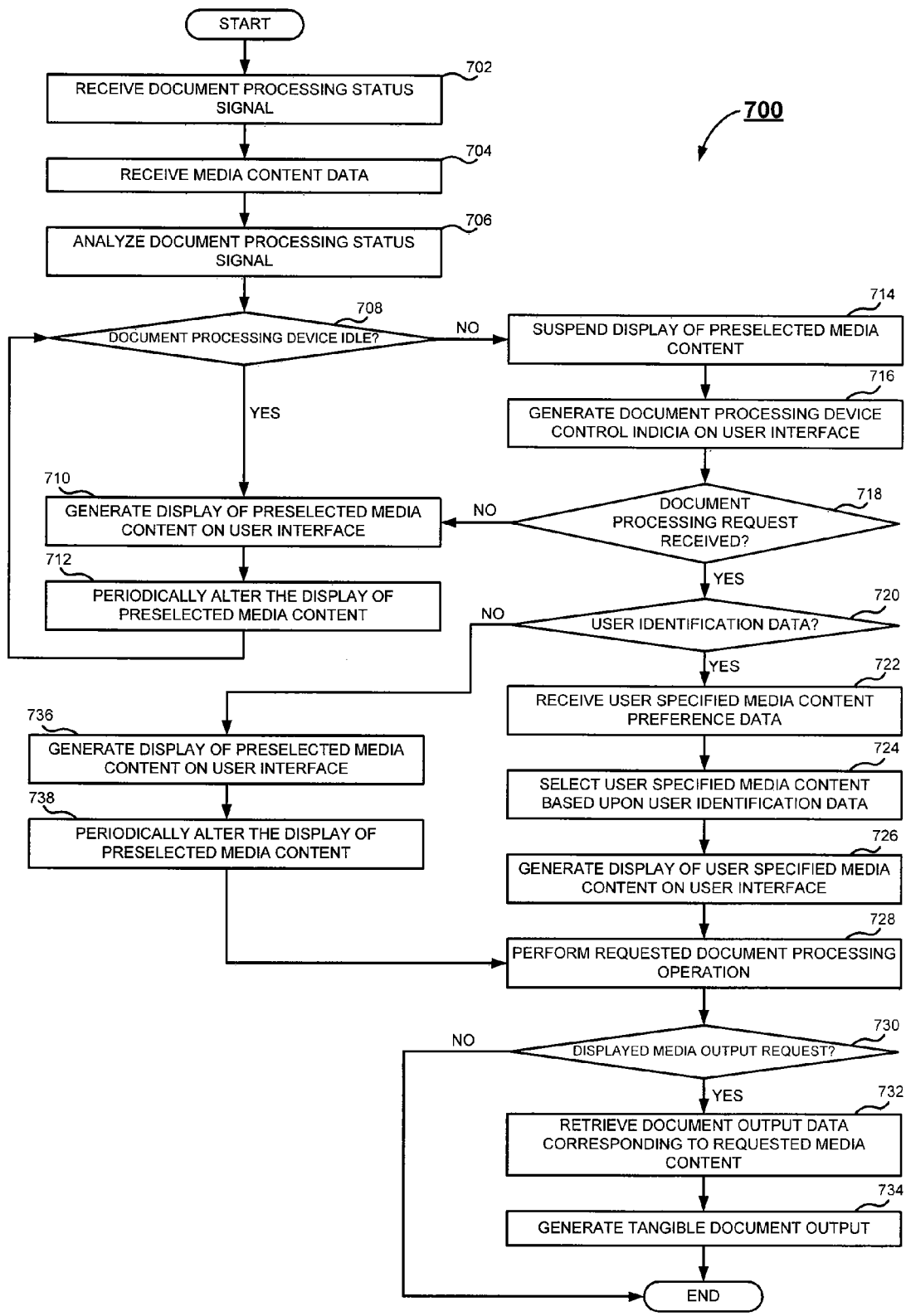
FIG. 7 is a flowchart illustrating a method for generating an informational media display on a document processing device according to one embodiment of the subject application.

Referring now to FIG. 7, there is shown a flowchart 700 illustrating a method for generating an informational media display on a document processing device in accordance with one embodiment of the subject application. The methodology depicted in FIG. 7 begins at step 702, whereupon a document processing signal representing document processing operation status on the document processing device 104 is received by the controller 108 or other suitable component. In accordance with one embodiment of the subject application, the status signal indicates the status of the document processing device 104 as idle (not performing any document processing operations) or active (performing one or more document processing operations). Media content is then received at step 704 by the document processing device 104, for example from the user device 126, a network server (not shown), designated Internet websites, data stored in the associated data storage device 112, and the like. The media content data includes, for example and without limitation, an RSS feed, advertisements, coupons, news items, calendar listings, reminders, entertainment items, and the like.

At step 706, the controller 108 or other suitable component associated with the document processing device 104 analyzes the received document processing status signal to determine the current status, e.g., idle or active, of the document processing device 104. A determination is then made at step 708 as to whether the document processing device 104 is idle; that is, not currently performing any requested document processing operations. Upon a positive determination at step 708 that the document processing device 104 is not active, flow proceeds to step 710, whereupon pre-selected media content, e.g., non-targeted advertisements, offers, news items, calendar listings, entertainment items, or the like, is generated on the display 120 of the kiosk 118, the user interface 106, or the like. The display of the pre-selected media content is periodically altered at step 712 so as to continuously display new media content via the user interface 106 and/or display 120, as well as to perform a screen saver operation on the user interface 106 and/or the display 120. It will be appreciated by those skilled in the art that the changes or alterations to the displayed media content are capable of being set by a suitable device 104 administrator, randomly via operations of the controller 108, externally via a suitable backend server (not shown), and the like. Flow then returns to step 708 and operations continue thereafter until a determination is made that the document processing status signal indicates that the document processing device 104 is active.

When it is determined at step 708 that the document processing device 104 is no longer idle, for example a user has interacted with the user interface 106 or the kiosk 118 (i.e., the user input device 122 or the touch screen display 120), a document processing request has been received via the computer network 102, or the like, flow proceeds to step 714. At step 714, the controller 108 or other suitable component associated with the document processing device 104 suspends the display of the pre-selected media content on the user interface 106 and/or the kiosk display 120. Indicia is then generated at step 716 on the user interface 106, the kiosk display 120, and the like, corresponding to control of the document processing device 104. The skilled artisan will appreciate that suitable control indicia includes, for example and without limitation, graphical icons representative of a document processing operation, document processing options, media content, storage, and the like.

A determination is then made at step 718 as to whether a document processing request has been received from an associated user; that is, whether a document processing operation such as copy, facsimile, electronic mail transmission, scan to storage, scan to device, or the like has been requested by the associated user. Those skilled in the art will appreciate that such a document processing request is capable of originating from a portable storage device inserted via the portable storage device reader 124, the portable storage interface associated with the document processing device 104, transmitted from the user device 126, or the like. Upon a determination at step 718 that no document processing request has been received, flow returns to step 710, whereupon a display of pre-selected media content data corresponding to non-targeted media content is generated on the user interface 106 and/or kiosk display 120, as set forth above.

Following receipt of the document processing request, flow progresses from step 718 to step 720, whereupon a determination is made as to whether user identification data has been received from the user associated with the received document processing request. The skilled artisan will appreciate that such user identification data is capable of being received during a user logon operation inclusive of a user ID and/or password, biometric scanning, smart card, or the like. Upon a negative determination at step 720, that is, no user identification data accompanied the received document processing request, flow proceeds to step 736, whereupon a display of pre-selected media content is generated on the associated user interface 106 and/or kiosk display 120. Such display is periodically altered at step 738 during the performance of the requested document processing operation at step 728, as set forth in greater detail below.

Returning to step 720, upon a determination that user identification data has been received, e.g., upon the receipt of an electronic document inclusive of user identification data, flow proceeds to step 722, whereupon user-specified media content preference data is retrieved from the data storage device 112, from a backend server component (not shown), a suitable website via the Internet, or the like. At step 724, a selection is made of specified media content based upon the received user identification data. A display of user-specified media content is then generated at step 726 on the user interface 106 and/or the display 120 associated with the kiosk 118. It will be appreciated by those skilled in the art that the user-specific media content corresponds to user preference data, e.g., types of news articles, product coupons, targeted advertisements, preferred entertainment items, and the like. The document processing device 104 then initiates the performance of the requested document processing operation at step 728. It will be appreciated by those skilled in the art that during the performance of the document processing operation at step 728, the display of pre-selected media content or user-specific media content continues on the associated user interface 106 and/or kiosk display 120.

Thus, while the document processing device 104 is performing the requested document processing operation, the associated user is capable of selecting one or more of the displayed media content for a tangible output. Thus, a determination is made at step 730 as to whether a displayed media content output request has been received from the associated user. When no such output request is received, the operations of FIG. 7 terminate upon completion of the requested document processing operation. When such a request has been received, the controller 108 or other suitable component associated with the document processing device 104 retrieves the corresponding media content at step 732. At step 734, the document processing device 104 generates a tangible document output on a suitable output media 114 in accordance with the received displayed media output request. In accordance with one embodiment of the subject application, the user is capable of electronically transmitting selected media content via electronic mail, facsimile transmission, or the like; that is, the output media request corresponds to the transmission of an electronic representation of the selected media content to a designated recipient, address, or the like.

For example, when the displayed media content corresponds to a coupon for goods or services, the user has the option of requesting a tangible output of such displayed media content. Thus, upon a determination at step 730 that a displayed media content output request has been received from the associated user, e.g. a coupon for goods or services, flow proceeds to step 732. At step 732, the controller 108 or other suitable component associated with the document processing device 104 retrieves media content, e.g. the coupon and associated bar code data, authentication data, and the like and prints a tangible copy of the coupon at step 734. In accordance with another example embodiment, the displayed media content is capable of corresponding to an advertisement for the direct purchase of a good or service via the document processing device 104, e.g. the document processing device 104 functions as a point-of-sale device. For example, the good corresponds to a gift card for a merchant, restaurant, or the like; the document processing device 104, via the controller 108, retrieves the necessary data associated with such good or service and generates a tangible output thereon, e.g. a gift card encoded with such retrieved data.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally, and equitably entitled.

What is claimed:

1. A system for generating an informational media display comprising:
    means for receiving pre-selected media content data;
    means for generating a display of the pre-selected media content data on a user interface associated with a document processing device when the document processing device is idle;
    means for generating a display of user-specified media content data on the user interface associated with the document processing device when the document processing device has received a request for a document processing operation from a user, the document processing operation selected from a list comprising facsimile, scanning, copying, printing, electronic mailing and storage of a document, the means for generating a display of user-specified media content data further comprising:
        means for suspending display of the pre-selected media content data on the user interface;
        means for receiving user identification data associated with the user; and
        means for retrieving user-specified media content data associated with the user in response to receipt of the user identification data.

2. The system of claim 1, the means for receiving user identification data further comprising means for receiving an electronic document into the document processing device, the electronic document including the user identification data.

3. The system of claim 1, wherein media content data is comprised of at least one of an advertisement, coupon, news item, calendar listing, reminder, and entertainment item.

4. The system of claim 3, further comprising:
    means for receiving a document output request corresponding to media content data displayed on the user interface; and
    means for generating a tangible document output corresponding to the displayed media content in accordance with the document output request.

5. The system of claim 3, wherein the media content data is comprised of an RSS feed.

6. The system of claim 3, further comprising means for periodically altering the display of pre-selected media content data so as to perform a screen saver operation on the user interface.

7. The system of claim 1, further comprising means for selectively generating a display of document processing device control indicia on the user interface in response to an indication that the document processing device is no longer idle.

8. A method for generating an informational media display comprising:
    receiving pre-selected media content data;
    generating a display of the pre-selected media content data on a user interface associated with the document processing device when the document processing signal indicates that the use of the associated document processing device is idle;
    generating a display of user-specified media content data on the user interface associated with the document processing device when the document processing device has received a request for a document processing operation from a user, the document processing operation selected from a list comprising facsimile, scanning, copying, printing, electronic mailing and storage of a document, by:
    suspending display of the pre-selected media content data on the user interface;
    receiving user identification data associated with the user; and
    retrieving user-specified media content data associated with the user in response to receipt of the user identification data.

9. The method of claim 8, further comprising:
    receiving an electronic document into the document processing device, the electronic document including the user identification data.

10. The method of claim 8, wherein media content data is comprised of at least one of an advertisement, coupon, news item, calendar listing, reminder, and entertainment item.

11. The method of claim 10, further comprising:
    receiving a document output request corresponding to media content data displayed on the user interface; and
    generating a tangible document output corresponding to the displayed media content in accordance with the document output request.

12. The method of claim 10, wherein the media content data is comprised of an RSS feed.

13. The method of claim 10, further comprising periodically altering the display of pre-selected media content data so as to perform a screen saver operation on the user interface.

14. The method of claim 8, further comprising selectively generating a display of document processing device control indicia on the user interface in response to an indication that the document processing device is no longer idle.

15. A method for generating an informational media display on a document processing device comprising:
   receiving media content data inclusive of preselected media content data and user-specific media content data, the user-specific media content data associated with a particular user;
   generating a display of preselected media content data until such time as an indication is received that the document processing device is no longer idle;
   accepting input of user identification data associated with the user;
   generating a display, in response to input of the user identification data, including the user-specific media content data associated with the user;
   completing a document processing operation requested by the user, the document processing operation selected from a list comprising facsimile, scanning, copying, printing, electronic mailing and storage of a document;
   accepting user input in response to the user-specific media content data from the user; and
   generating a tangible document output associated with the user-specific media content data using the document processing device in response to the user input.

16. The method of claim 15 further comprising requesting and receiving user-specific media content preference data in response to input of user identification data associated with the user.

17. The method of claim 15 further comprising periodically altering the display of preselected media content prior to input of user identification data associated with the user to thereby cause the preselected media content to act as a screen saver.

18. The method of claim 15 further comprising receipt of a document processing request selected from the group consisting of a print request, a facsimile request, a scan request and an email request prior to accepting input of user identification data associated with the user.

19. The method of claim 15 wherein the user-specific media content incorporates interactive elements suitable for accepting input from the user to thereby direct the document processing device as input.

* * * * *